No. 882,667. PATENTED MAR. 24, 1908.
A. H. CONNELL.
COTTON CULTIVATOR ATTACHMENT.
APPLICATION FILED APR. 27, 1907.

2 SHEETS—SHEET 1.

WITNESSES:

Alexander H. Connell INVENTOR

By C. A. Snow & Co.
ATTORNEYS

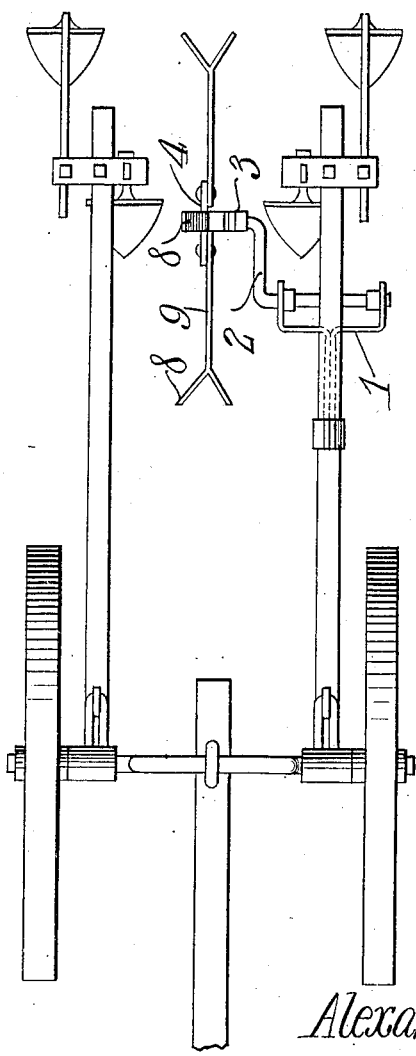

UNITED STATES PATENT OFFICE.

ALEXANDER HARDEE CONNELL, OF ANNONA, TEXAS.

COTTON-CULTIVATOR ATTACHMENT.

No. 882,667.　　　Specification of Letters Patent.　　Patented March 24, 1908.

Application filed April 27, 1907. Serial No. 370,664.

*To all whom it may concern:*

Be it known that I, ALEXANDER H. CONNELL, a citizen of the United States, residing at Annona, in the county of Red River and State of Texas, have invented a new and useful Cotton-Cultivator Attachment, of which the following is a specification.

This invention has relation to cotton cultivator attachments and it consists in the novel construction and arrangement of its parts as hereinafter shown and described.

The object of the invention is to provide an attachment adapted to be applied or attached to an ordinary cultivator and which may be arranged for preserving all of the plants in a row or stand, or only those at certain intervals therein as preferred, while the other cotton plants are destroyed along with the weeds by plowing earth upon them.

The attachment consists primarily of a crank shaft upon which is journaled a hub having an annular flange. A fender is provided which may be attached to the said flange when it is desired to leave all of the plants in the row standing or the said fender may be removed and cups spaced at suitable intervals apart may be attached to the flange for protecting the plants at intervals and allowing the cultivator shovels to cover those plants occurring between such intervals. The earth engaging portion of the fender and the said cup are V-shaped in transverse section.

Figure 1:
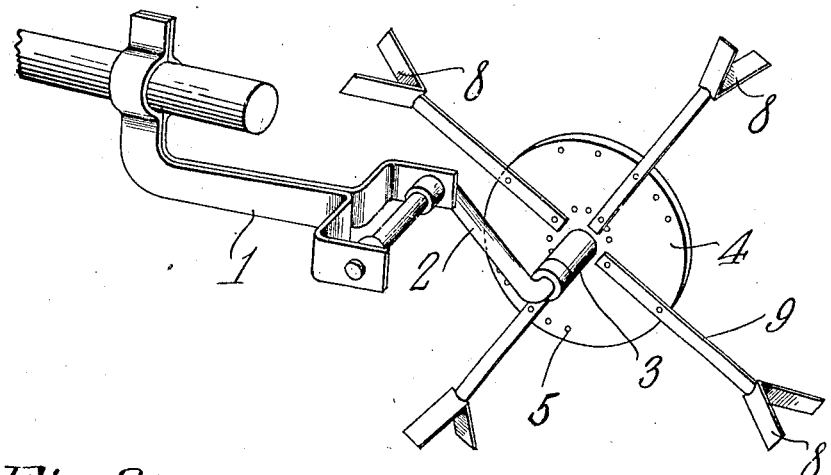
Figure 2:
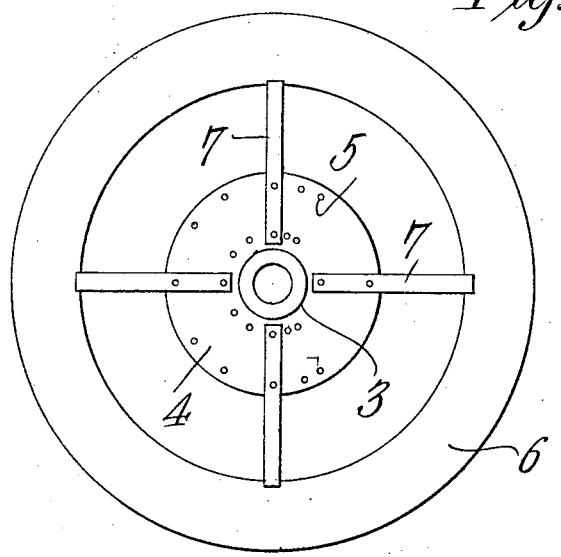
Figure 3:
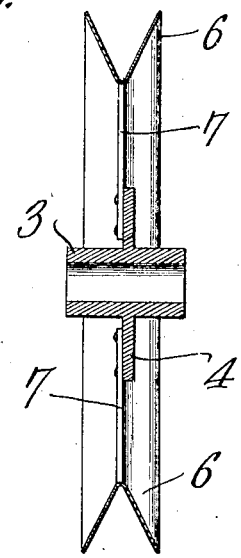

In the accompanying drawing:—Figure 1 is a perspective view of the chopper. Fig. 2 is a side elevation of a modified form of the same. Fig. 3 is a vertical sectional view of the chopper as shown in Fig. 2. Fig. 4 is a view showing the chopper attached to a cultivator.

The attachment consists of the arm 1 which is adapted to be applied to the frame of a cultivator. One end of the shaft 2 is journaled in the said arm. Said shaft is in the form of a double crank and upon its opposite end is journaled the hub 3. The hub is provided upon its periphery with an annular flange 4. Said flange is provided with a number of bolt perforations 5. The fender 6 is of circular configuration in side elevation and V-shaped in cross section. The said fender is provided with rods 7 which are adapted to be bolted to the sides of the flange 4 by bolts passing through the perforations 5 thereof. The cups 8 are V-shaped in cross section and each cup is provided with a rod 9 which is adapted to be bolted to one side or the other of the flange 4 by bolts passing through the perforations 5 thereof. The perforations 5 are so arranged in the flange 4 that three, four, five or six cups may be applied thereto and spaced at equal distances apart.

From the foregoing description it is obvious that when the fender is applied to the flange that all of the plants in the row will be protected from the soil cast up by the cultivator shovels and the entire stand of plants will remain in the row, when, however, the said fender is removed and the cups are applied to the flange the plants at intervals only will be protected from the soil while the plants occurring between the said intervals will be covered and destroyed. The V-shaped configuration of the plant protectors affords ample area or surface for the protection of the plants and at the same time makes a light attachment in that the retaining rods are attached to the apex or angle formed at the sides of the protectors.

Having described my invention what I claim as new and desire to secure by Letters Patent is:—

A cultivator attachment comprising means for attaching with a cultivator, a hub journaled upon said means and having an annular perforated flange, a V-shaped protector having a rod at its apex which is adapted to be attached to said flange the side edges of said protector being spaced apart along their entire lengths.

In testimony that I claim the foregoing as my own, I have hereto affixed my signature in the presence of two witnesses.

ALEXANDER HARDEE CONNELL.

Witnesses:
　C. C. HOTCHKISS,
　G. H. BECKER.